UNITED STATES PATENT OFFICE.

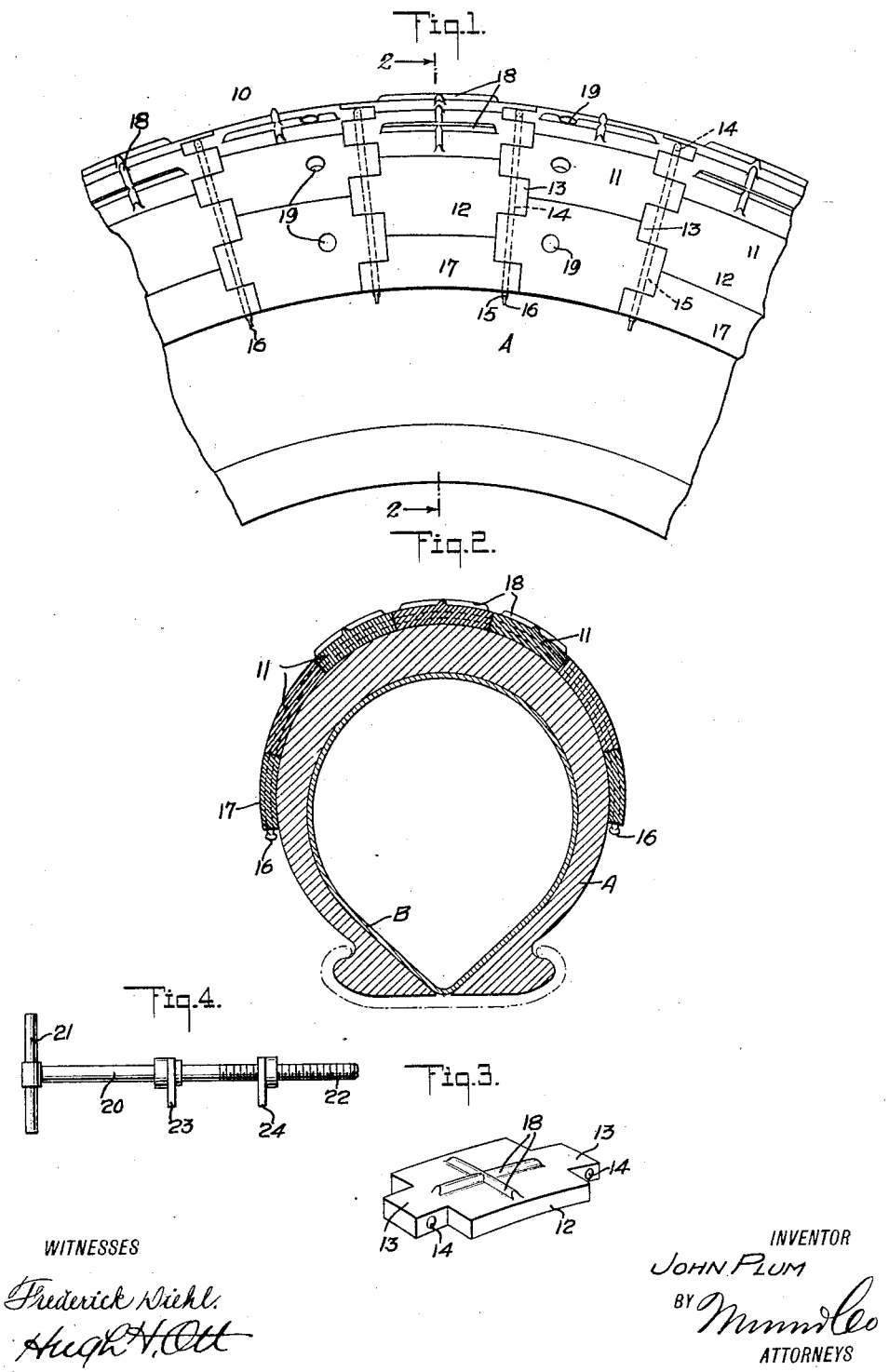

JOHN PLUM, OF BRIDGEPORT, CONNECTICUT.

TIRE ARMOR.

1,404,642. Specification of Letters Patent. Patented Jan. 24, 1922.

Application filed January 12, 1921. Serial No. 436,755.

*To all whom it may concern:*

Be it known that I, JOHN PLUM, a citizen of the United States, and a resident of Bridgeport, in the county of Fairfield and State of Connecticut, have invented a new and Improved Tire Armor, of which the following is a full, clear, and exact description.

This invention relates to pneumatic tires for vehicle wheels and has particular reference to a protective armor adapted to be associated therewith for rendering the same puncture-proof and eliminating to a large extent wear on the tread surface thereof.

The invention contemplates the provision of an armor which further functions to prevent skidding and to provide an effective tractive surface during the operation of the wheel.

A further object of the invention is to provide an armor of the character described which includes a plurality of mating sections with means for associating the same to permit of the removal and renewal of one or more of said sections should same become broken or otherwise unfit for use.

Another object in view resides in the provision of an armor for pneumatic tires which is circumferentially adjustable by the removal or addition of sections thereto to render the same applicable to tires of various sizes.

A still further object of the invention is to provide a tire armor of the character described which is comparatively simple in construction, inexpensive to manufacture, and which is strong, durable and highly efficient in its purpose.

With the above and other objects in view, some of which will appear hereafter, reference is had to the following specification, the appended claim and the accompanying drawings, in which—

Figure 1 is a fragmentary side elevation of the tire equipped with an armor constructed in accordance with the invention.

Figure 2 is a transverse sectional view therethrough taken approximately on the line 2—2 of Figure 1.

Figure 3 is a detail perspective view of one of the armor plates or sections.

Figure 4 is a side elevation of a tool employed for the purpose of applying the armor to a tire.

Referring to the drawings by characters of reference, A designates the shoe or casing of a pneumatic tire, and B the inner tube which is adapted to be arranged therein and inflated in the ordinary manner for giving the proper resiliency to the tire.

The armor is designated generally by the numeral 10 and consists of a plurality of sections or plates 11 of substantially identical construction. Each of the plates or sections comprises a substantially rectangular body portion 12 provided at the opposite ends with the lugs or extensions 13 which are transversely apertured as at 14. The plates or sections are preferably dished or curved longitudinally and transversely to conform to the tire surface and snugly fit the same. In assembling the sections to produce the armor, the plates are arranged in rows, the sections of each adjacent row being staggered to dispose the lugs or extensions 13 out of longitudinal alignment whereby the lugs of one row will mesh or interfit with the lugs of the next adjacent row. The outermost plates are proportionately reduced in length to correspond with the reduction in the circumferential measurements of the tire and the apertures 14 are aligned to receive a connecting and pivot rod 15 which is adapted to pass therethrough and the extremities of which are upset as at 16 or provided with any other suitable means to retain the sections in proper relation. To provide means for completing the armor, suitable filler sections 17 are utilized to fill the space which would otherwise obtain due to the staggered arrangement of the plates. In practice, it is preferable to provide the central plates with upstanding ribs or calks 18 which function to prevent lateral skidding and operate to augment the tractive action of the armor. Certain of the plates are provided with recesses 19 in their outer surfaces, with which the tool illustrated in Figure 4 is adapted to co-act for effecting the application of the armor to the tire. This particular tool includes a shank 20 provided at one extremity with a manipulating handle 21 and threaded at its opposite extremity as at 22. A stationary lug 23 is swiveled on the shank and a movable lug 24 is internally threaded on the threaded extremity 22 whereby upon rotation of the shank relative movements of said lugs will be effected.

In applying the armor to the tire, it is obvious that the same as built up will be disconnected at one point in its periphery by the removal of one of the pivot rods 15. To bring the disconnected ends together for the purpose of passing the pivot rods through the apertures in the extensions 13, the tool is employed by inserting the stationary lug 23 in the apertures at one end and the movable lug 24 in one of the apertures of the opposite end. The shank is then rotated in the proper direction to effect movement of the lugs toward each other, thereby drawing the ends together to permit of the insertion of the pivot rod 15. The ends of said pivot rod are then upset to retain the sections in proper relation. When the armor is applied, the same will effectively protect the tread surface and the sides of the shoe against wear or punctures, and the pivotal mounting of the plates will permit of a limited independent movement whereby the natural resiliency of the pneumatic tire will properly operate to absorb road shocks. The ribs or calks 18 will operate to prevent lateral skidding and will function to increase the traction surface on the road.

While there has been illustrated and described a single and preferred embodiment of the invention, no limitation is necessarily made to the precise structural details, as it is to be understood that variations and modifications which properly fall in the scope of the appended claim may be resorted to when found expedient.

What I claim is:

A combination armor and traction shoe for pneumatic tires comprising a plurality of plates each of which includes a substantially rectangular body portion and a transversely apertured lug of reduced width projecting centrally from the opposite ends thereof, said plates arranged in transverse rows over the tread of the tire with the adjacent rows in staggered relation to dispose the same out of longitudinal alignment, whereby the lugs of each adjacent row will receive therebetween the lugs of the next adjacent plates to dispose the transverse apertures thereof in alignment, and an arcuate pivot rod passed through the apertures of said lugs to form a connection between the adjacent rows and permit of the circumferential flexing of the armor with the tire.

JOHN PLUM.